United States Patent [19]

Ferris et al.

[11] Patent Number: 4,591,774

[45] Date of Patent: May 27, 1986

[54] HIGH PERFORMANCE INCREMENTAL MOTION SYSTEM USING A CLOSED LOOP STEPPING MOTOR

[75] Inventors: Timothy A. Ferris, Simi Valley; Stephen M. Fortescue, Northridge; Gaston Palombo, Agoura, all of Calif.

[73] Assignee: Dataproducts Corporation, Woodland Hills, Calif.

[21] Appl. No.: 671,032

[22] Filed: Nov. 14, 1984

Related U.S. Application Data

[63] Continuation of Ser. No. 265,858, May 21, 1981, abandoned.

[51] Int. Cl.⁴ ............................................. H02P 8/00
[52] U.S. Cl. .................................. 318/696; 318/685; 318/254
[58] Field of Search ............... 318/685, 696, 138, 254, 318/254 A; 310/49 R

[56] References Cited

U.S. PATENT DOCUMENTS

| | | | |
|---|---|---|---|
| 3,849,714 | 11/1974 | Goretzki et al. | 318/685 |
| 4,219,766 | 8/1980 | Lin | 318/594 |
| 4,228,387 | 10/1980 | Brown | 318/696 |
| 4,242,624 | 12/1980 | Schack et al. | 318/696 |
| 4,246,518 | 1/1981 | Kögler et al. | 318/138 |
| 4,250,544 | 2/1981 | Alley | 318/696 |
| 4,328,450 | 5/1982 | Gabor | 318/685 |
| 4,353,019 | 10/1982 | Sweeney, Jr. | 318/592 |
| 4,422,113 | 12/1983 | Mabon | 360/78 |

FOREIGN PATENT DOCUMENTS 510076 5/1977 Australia.
53-30720 3/1978 Japan.

Primary Examiner—William M. Shoop
Assistant Examiner—Saul M. Bergmann
Attorney, Agent, or Firm—Spensley Horn Jubas & Lubitz

[57] ABSTRACT

A motor control system for a high accuracy incremental motion system such as a paper feed system in a high speed printer. The system utilizes a stepping motor which is driven in one of two modes, depending upon its position. During most of the movement from one position to another, the motor is driven as a DC brushless motor. This is accomplished by commutating the phases of the motor so that they are energized around the peaks of their torque curves. The motor is driven in a closed loop fashion, with velocity commands being generated by a velocity profile generator incorporating a microprocessor. Both position and velocity feedback are utilized. Since the motor is driven as a DC brushless motor, traditional control theory methods (e.g., Root locus, Bode, etc.) can be employed.

As the motor nears the final desired position, the system switches so that the motor is energized as a step motor. This energization is applied when the motor is less than one motor step from its final position, and causes the motor to be drawn to a null point and held in position. Velocity feedback is provided to damp the motor so as to further decrease positioning time.

14 Claims, 13 Drawing Figures

SERVO SYSTEM BLOCK DIAGRAM

SERVO SYSTEM BLOCK DIAGRAM

SUMMING AMPLIFIER #1
ABSOLUTE VALUE
CURRENT LIMIT

STEPPING MOTOR COMMUTATOR

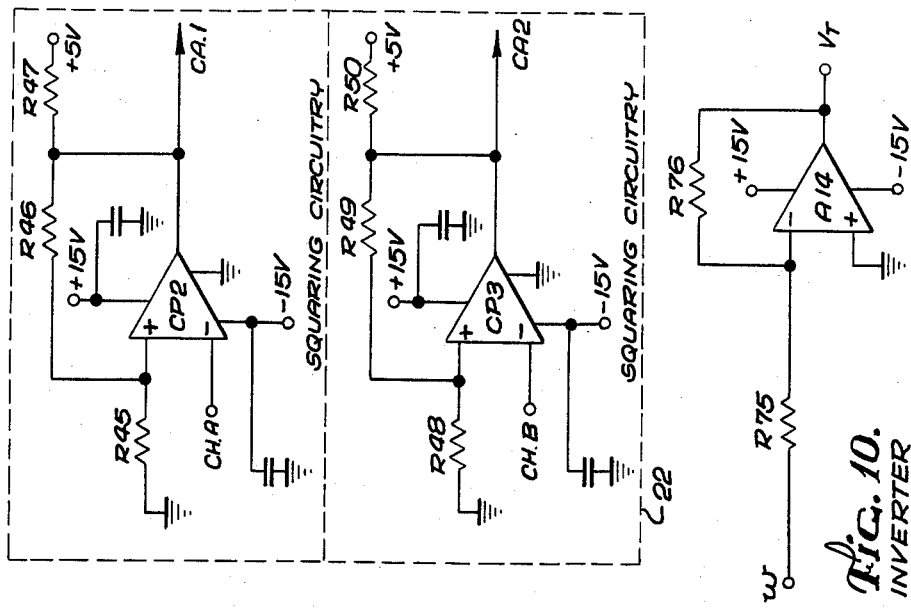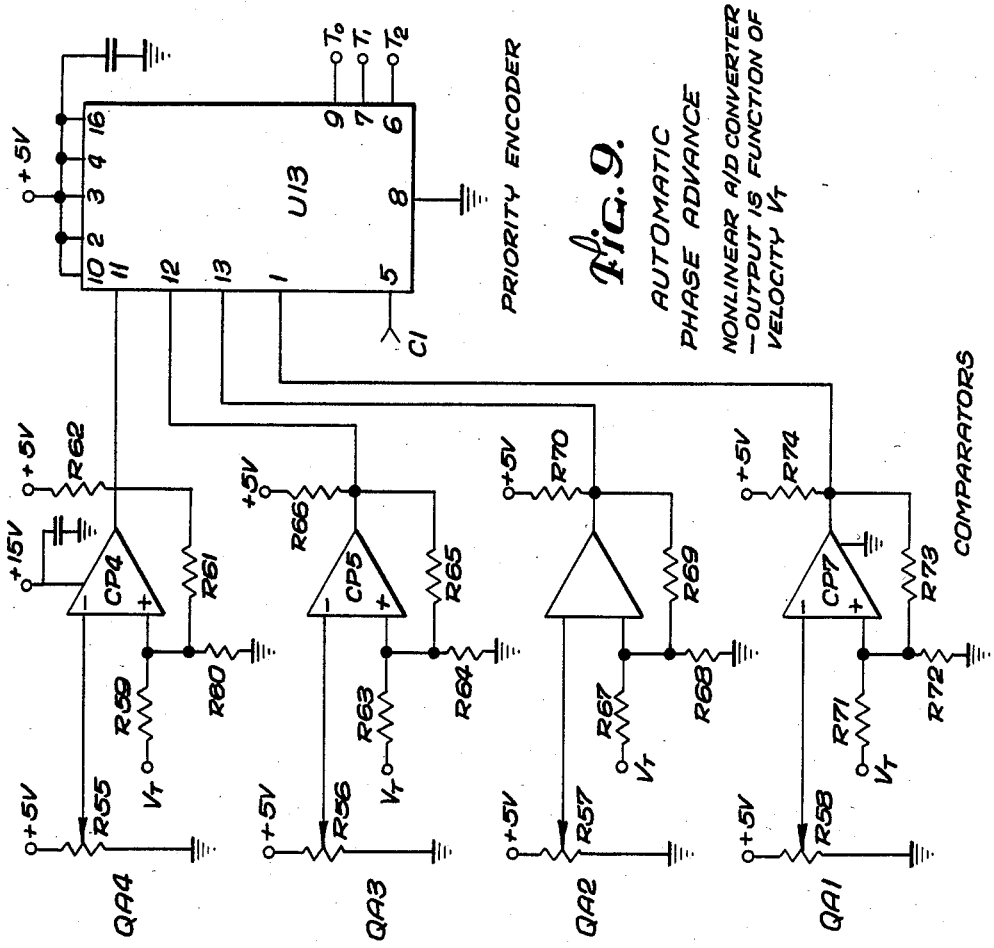

Fig. 12. DAMPING SELECTOR

ELECTRONIC TACHOMETER

HIGH PERFORMANCE INCREMENTAL MOTION SYSTEM USING A CLOSED LOOP STEPPING MOTOR

This is a Continuation of application Ser. No. 265,858, filed May 21, 1981, now abandoned.

BACKGROUND OF THE INVENTION

1. Field of the Invention

This invention relates to an incremental motion control system for controlling the position of a motor. More particularly, this invention relates to a paper feed system for use with high speed line printers, i.e., those which print at a rate of greater than 1,000 lines per minute.

High speed line printers generally employ a type font carried on a band which moves horizontally across the paper being printed. A hammer bank impacts against the moving band to cause printing. In order to increase the throughput of the printer, either the paper feed time (the time to move the paper from one print line to the next) and/or the print time (the time it takes to actually print a line) must be decreased. A reduction in print time is generally undesirable, since it also brings about a reduction in print quality. This is due to the fact that in order to reduce print time, the font speed must be increased, resulting in smearing of the characters. Therefore, it is desirable to provide as much time as is possible to accomplish actual printing. This means that paper feed time should be reduced to an absolute minimum.

2. Description of the Prior Art

Several methods have been utilized in the past to rapidly increment paper for a high speed line printer. One method involves the use of an open loop step motor, driven by any number of drive schemes, and incremented by a fixed timing sequence. This type of motor requires a torque margin to prevent a loss of steps, and therefore the full torque of the motor cannot be utilized. In addition, the motor is sensitive to load variations and is susceptible to resonances. Such a motor is very underdamped and will ring when positioning.

A second type of method uses a closed loop servo control system along with a DC brush type motor. A DC generator or an electronic tachometer is used for velocity feedback, and a position encoder is sometimes used for position feedback loops. The motors used in this type of system are relatively inefficient, and generally require undesirable forced air cooling for medium to high speed systems. Because of the motor's inefficiency, the system consumes a great deal of power.

Yet another type of system utilizes a clutch and brake to incrementally couple the paper feed mechanism to a continuously rotating shaft. Such systems are generally quite complex and are prone to misadjustment and unreliable performance. In addition, these systems are relatively expensive when used for high speed printers.

Some attempts have been made to utilize a step motor in a closed loop system for incremental motion. These previous attempts have not been able to deliver the high performance necessary to increment very rapidly. In addition, the damping of such systems has generally been quite poor.

One prior art system is disclosed in U.S. Pat. No. 4,228,396 to Palombo, et al. This system utilizes a brushless DC motor driven in a servo controlled fashion. Other paper feed control systems are disclosed in U.S. Pat. Nos. 3,524,528 to Peyton and 3,656,041 to Bonzano.

SUMMARY OF THE INVENTION

The present invention provides a low-cost high performance incremental motion system for high speed paper feed. The system utilizes a stepping motor which is driven as a DC brushless motor in a first, or "velocity", mode and as a stepping motor in a second, or "position", mode.

The system includes a unique velocity profile generator including a microprocessor and memory and digital-to-analog converter. The microprocessor creates a digital representation of desired velocity. The digital signal is then converted to an analog signal. The desired velocity signal is compared with the actual velocity of the motor and an error signal is generated to drive the motor. The system includes current limiting circuitry which limits the drive current at a level just below motor demagnitization. This enables the motor to accelerate and decelerate as rapidly as possible, thus increasing the paper feed speed.

A unique commutator and phase advance circuit is included to control the energization of the phases of the motor. The phases are energized symmetrically around the maximums of their torque curves, thus causing the stepping motor to effectively operate as a DC brushless motor. In addition, phase advance circuitry is included to account for the time constant of the motor and to give maximum torque during acceleration and deceleration.

When the motor position approaches the final desired position, the control system switches the drive so that the motor functions as a stepping motor with velocity feedback to provide damping of the motor. The damping circuitry provides damping which is proportional to the velocity of the motor. By driving the motor both as a brushless DC motor and as a stepping motor, a very high efficiency, low-cost system is provided. Problems and limitations associated with open loop step motor systems (e.g., loss of motor steps, sensitivities to load variations, ringing and overshoot, resonances and low torque utilization) either have been eliminated entirely or greatly reduced. When used in the system of the present invention, the stepping motor is very efficient and is able to do much more work than equivalent volume motors of previous servo systems. In addition, no external cooling is required. Because of the motor's high efficiency, the cost of the paper feed system is substantially lower than that of previous systems of equivalent performance.

BRIEF DESCRIPTION OF THE DRAWINGS

The invention will be described with reference to the accompanying drawings in which:

FIG. 8 is a schematic diagram of the squaring circuitry of FIG. 1;

FIG. 9 is a schematic diagram of automatic phase advance circuitry of the control system;

FIG. 10 is a schematic diagram of an inverter to produce a velocity signal used by the phase advance circuitry;

DETAILED DESCRIPTION OF THE DRAWINGS

The following description is of the best presently contemplated mode of carrying out the invention. This description is not to be taken in a limiting sense, but is made merely for the purpose of illustrating the general principles of the invention since the scope of the invention is best defined by the appended claims.

Figure 1:
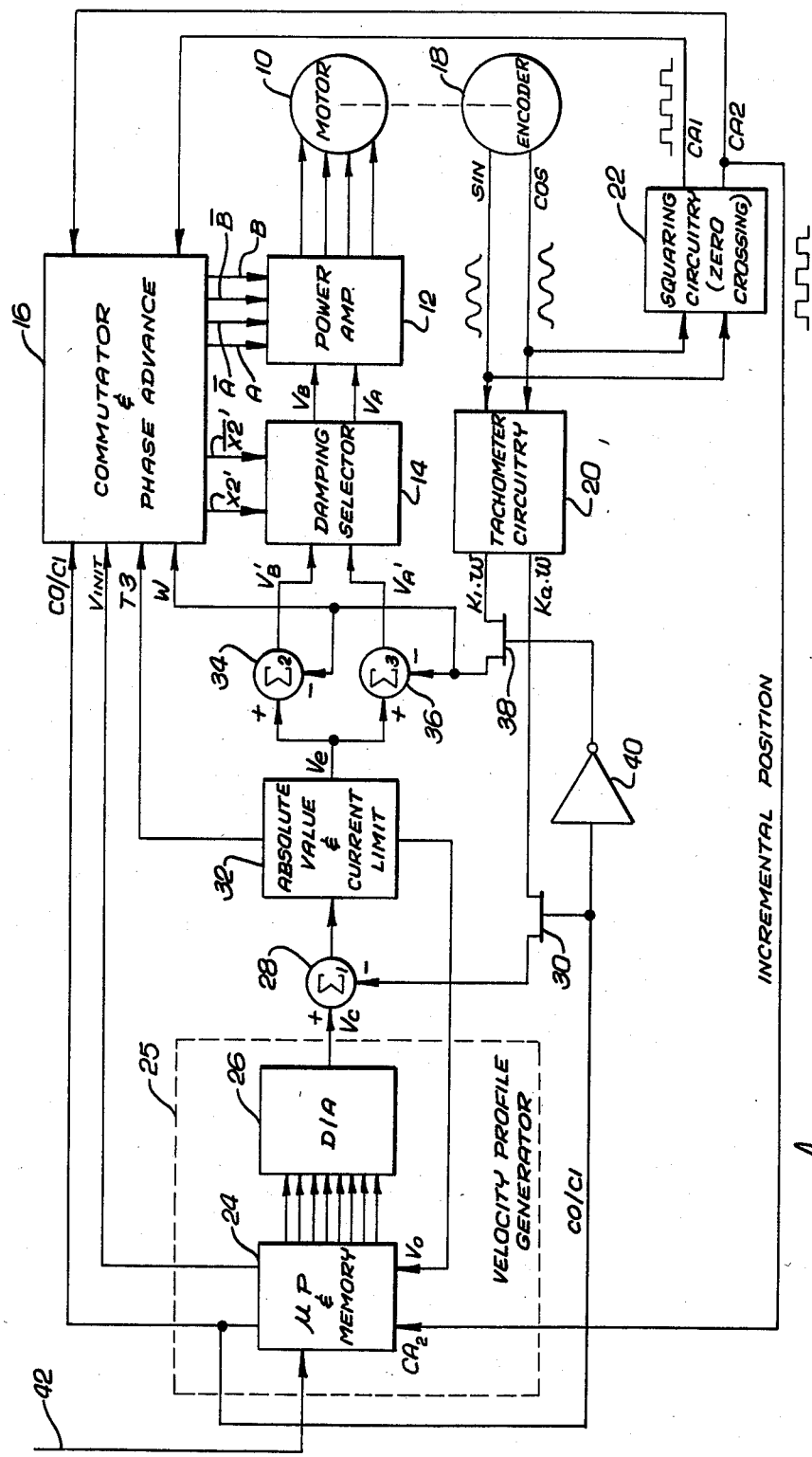
FIG. 1 is a block diagram of the control system of the invention.

Referring to FIG. 1, a stepping motor 10 is utilized to provide incremental motion for a paper feed system in a line printer. In the present embodiment of the invention, the motor 10 is a standard four phase, 1.8 degree step, hybrid permanent magnet stepping motor. One example of such a motor is the Superior Electric Model M093. This motor provides the necessary torque and is very efficient when used in the system of FIG. 1.

The motor 10 is driven by a power amplifier 12, which is a pulse width modulated, high power transconductance amplifier. It receives as inputs two unipolar voltages from a damping selector 14 and converts each one to a proportional current for whichever of the two phases of the stepping motor are on at a given time. The phase energization of the power amplifier 12 is controlled by means of commutator and phase advance circuitry 16.

The position of the shaft of the motor 10 is detected by means of an encoder 18. In the present embodiment, the encoder is a 200 cycle per revolution optical encoder which provides separate sine and cosine outputs. The 200 cycle per revolution corresponds to one cycle per motor step, thus simplifying the use of the encoder information for switching the motor phases. The output of the encoder 18 is connected to a tachometer 20 and squaring circuitry 22. The tachometer processes the sine and cosine outputs and generates a bipolar output proportional to the velocity of the motor. The squaring circuitry 22 converts the encoder signals to pulse signals thereby providing an incremental position indication. The output of the squaring circuitry 22 is connected as an input to a microprocessor and memory 24, as well as to the commutator and phase advance circuitry 16. The digital output of the microprocessor and memory 24 is connected to a digital to analog (D to A) converter 26, which generates an analog signal proportional to the desired velocity of the motor.

The error between the desired velocity as represented by the output of the converter 26 and the actual velocity is determined by a summing amplifier 28, which receives a velocity feedback signal from the tachometer 20 through an FET switch 30. The error signal generated by the summing amplifier 28 is connected to absolute value and current limit circuitry 32, which provides an absolute value signal of the output of the amplifier 28, limited to a predetermined maximum current. In addition, a polarity signal T3 indicating the direction of the error is provided to the commutator circuitry 16. The absolute value current signal is provided to summing amplifiers 34 and 36, whose outputs are connected to drive the damping selector 14. The amplifiers 34 and 36 receive a velocity signal from the tachometer 20 via an FET switch 38. The switches 30 and 38 are controlled by a logic output of the microprocessor and memory section 24. An inverter 40 causes the switch 30 to be opened when switch 38 is closed and vice versa.

The configuration of FIG. 1 is such that the motor 10 is driven in one of two modes, namely a velocity mode or a position mode. In the velocity mode, the velocity profile generator 25 provides a velocity command which is used to control the energization of the motor until it reaches a location very close to the desired position. In this mode, the motor is effectively driven as a brushless DC motor. This is accomplished by switching the drive current to the motor phases symetrically around the motor's peak holding torque. When the motor comes close to the desired position (within $\frac{1}{4}$ motor step in the present embodiment), the system is switched to the position mode, in which the motor is driven as a stepping motor to cause it to be held at its desired position. It should be noted that in the position mode, the motor does not actually move through a number of steps. Rather, the motor is energized in a normal step motor fashion to cause it to move a portion of a step until it reaches a null position.

Initially, the system will be in the position mode and the motor velocity and position will be zero. Upon receipt of a paper feed command (e.g., a command which instructs the system to step the paper one line, which generally corresponds to either six or eight motor steps) on line 42 the microprocessor forces lines CO/C1 and Vinit low. This closes the FET switch 30 and opens the FET switch 38, which puts the system in the velocity mode. The microprocessor starts incrementing the D to A converter 26 as fast as possible. The analog voltage output of the D to A converter 26 will thus increase rapidly. Since the velocity of the motor will initially lag behind the desired velocity as indicated by the output of the D to A converter 26, a relatively large error signal will be generated by the summing amplifier 28. This error signal is processed by the absolute value and current limiting circuitry 32, and signals representing the magnitude of the error are coupled to the power amplifier 12 through the summing amplifiers 34 and 36 and the damping selector 14. When the system is in the velocity mode, the amplifiers 34 and 36 and the selector 14 simply provide straight connections between the circuitry 32 and the power amplifier 12, since the switch 38 is open.

By forcing CO/C1 low, the commutator and phase advance circuitry 16 is controlled so that the motor will accelerate as long as there is an error between the velocity command and response. As the D to A output increments faster than the motor responds, the error voltage will be limited by the limiter 32 quickly. The limiting is detected by the processor on line Vo, and the D to A output is held constant until the response "catches up" and the error voltage falls below the limit level. At this point the microprocessor increments the D to A output again, and the process repeats. The limit is chosen at a value slightly lower than the demagnetization level of the motor so that the motor is accelerated at the maximum rate possible.

This method of control in the velocity mode allows the stepping motor to accelerate at its maximum potential while maintaining control. The motor velocity is directly dependent upon the velocity command.

When the velocity command reaches a predetermined level, called the terminal velocity, the microprocessor will stop incrementing the D to A, putting the system into a constant velocity mode. Input CA2 is polled looking for the pulse indicating the start of deceleration (i.e., a predetermined point where deceleration should begin), and when it is encountered the microprocessor starts to decrement the D to A output as rapidly as possible. When the error voltage limits, the microprocessor will stop decrementing the D to A output until the velocity response again "catches up". As soon as the error voltage drops below the limit, the microprocessor will start decrementing the D to A output again, and the process repeats.

Figure 2:
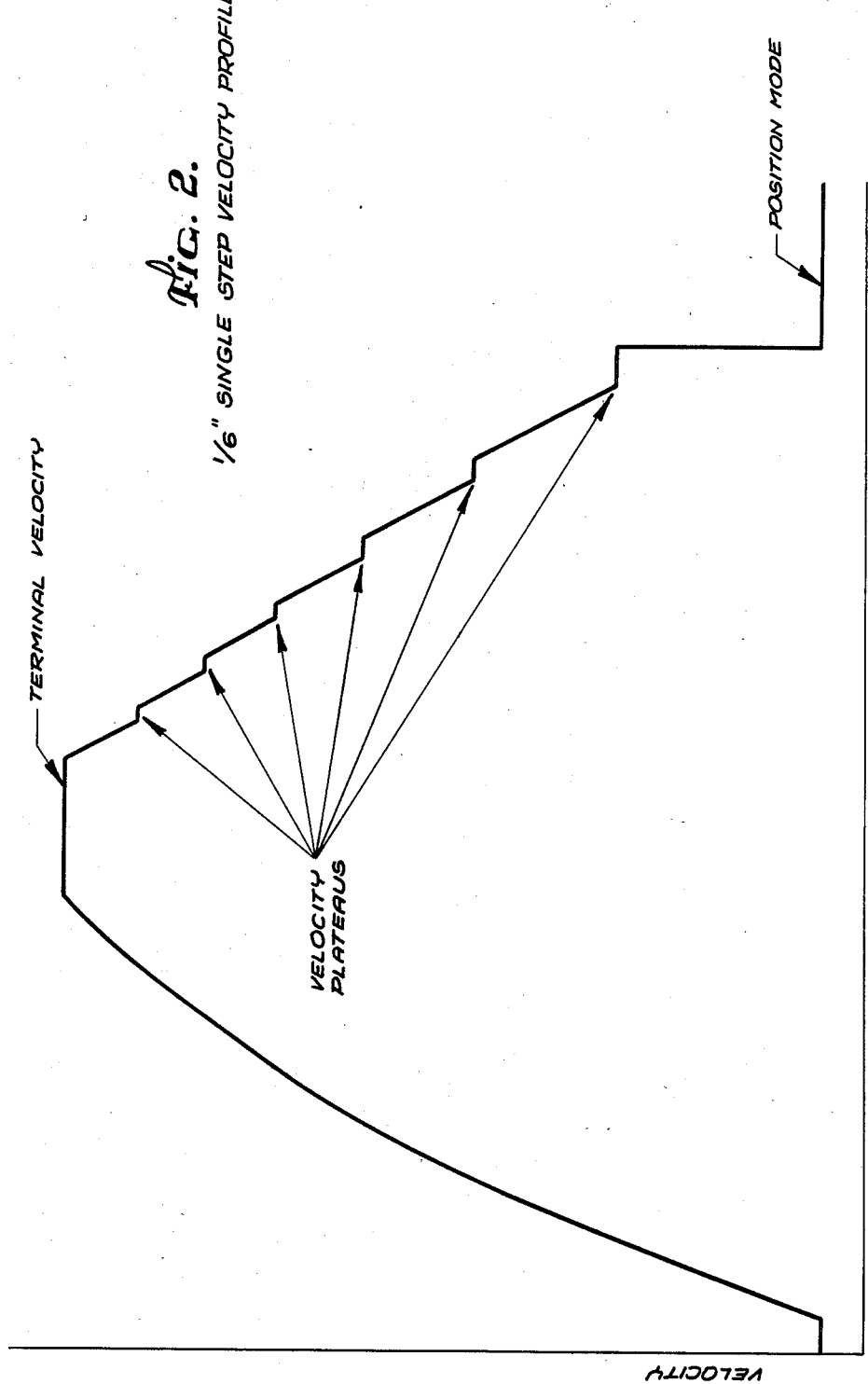
FIG. 2 is a graph of the velocity profile used with the invention.

The velocity profile generator 25 establishes a velocity profile as shown in FIG. 2. Minimum step time is obtained by using an essentially triangular velocity profile. In addition, for a given step time, the triangular velocity profile has the lowest acceleration. On the deceleration side, the profile is a staircase, and includes a number of velocity "plateaus". When the D to A output reaches one of the velocity plateaus, the microprocessor will hold that level until an encoder transition at CA2 occurs. At this point the microprocessor repeats the deceleration staircase until the final encoder transition is encountered, at which time the D to A output is set to a fixed level for the position mode gain, and C0/C1 and Vinit are forced high, putting the system into position mode.

The velocity plateaus create a staircase effect when decelerating. The purpose of these plateaus is to provide velocity-position checkpoints so that the velocity error when entering the position mode is small. This means motor overshoot and settling time are insignificant and can be ignored. If these plateaus are needed, the greater the number used, the shorter the step time will be. Therefore, it is preferable in the present embodiment that the number of plateaus is seven, equal to the number of encoder transitions during deceleration.

Figure 3:
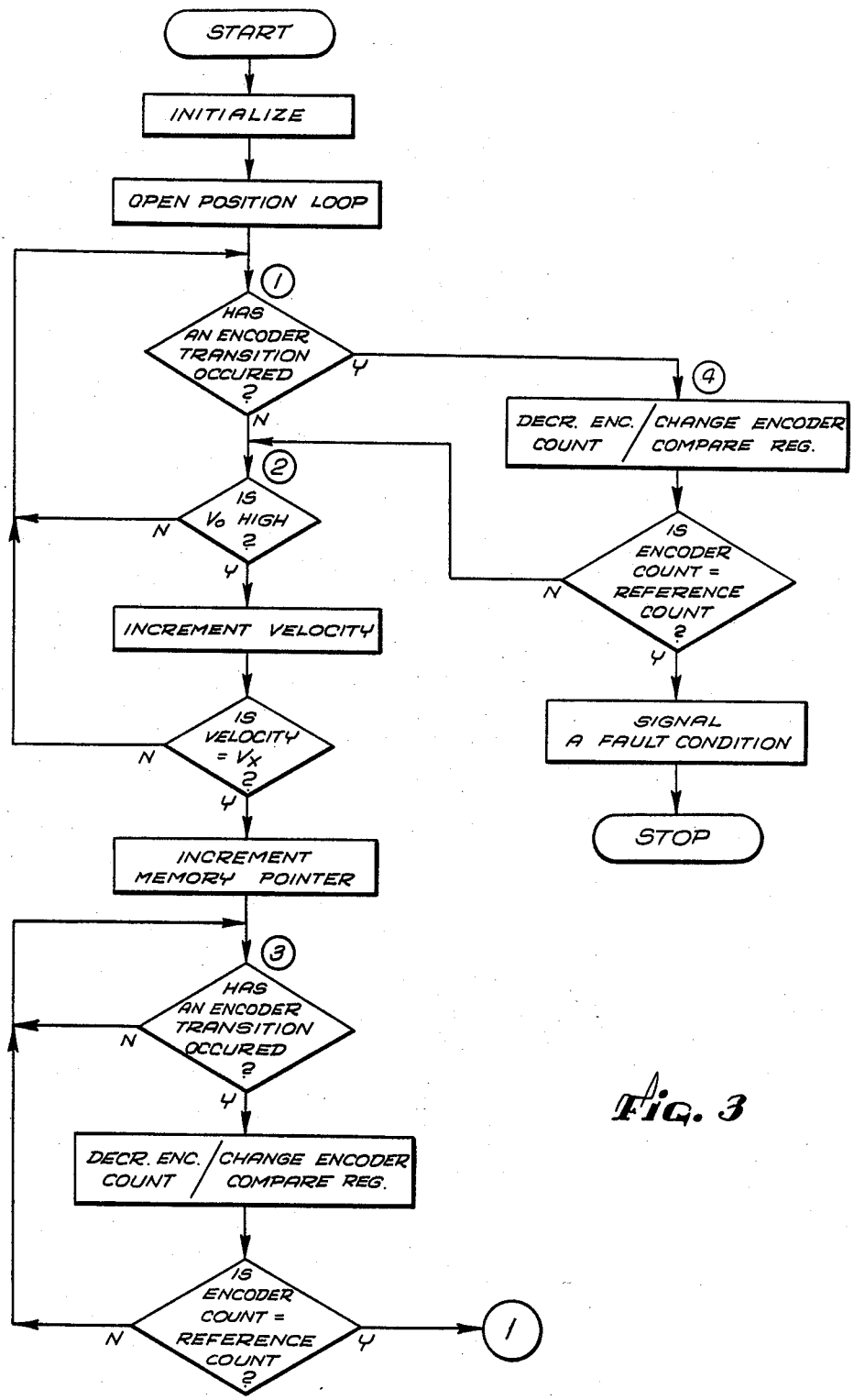
FIGS. 3-4 illustrate the flow chart for the microprocessor used with the present invention.
Figure 4:
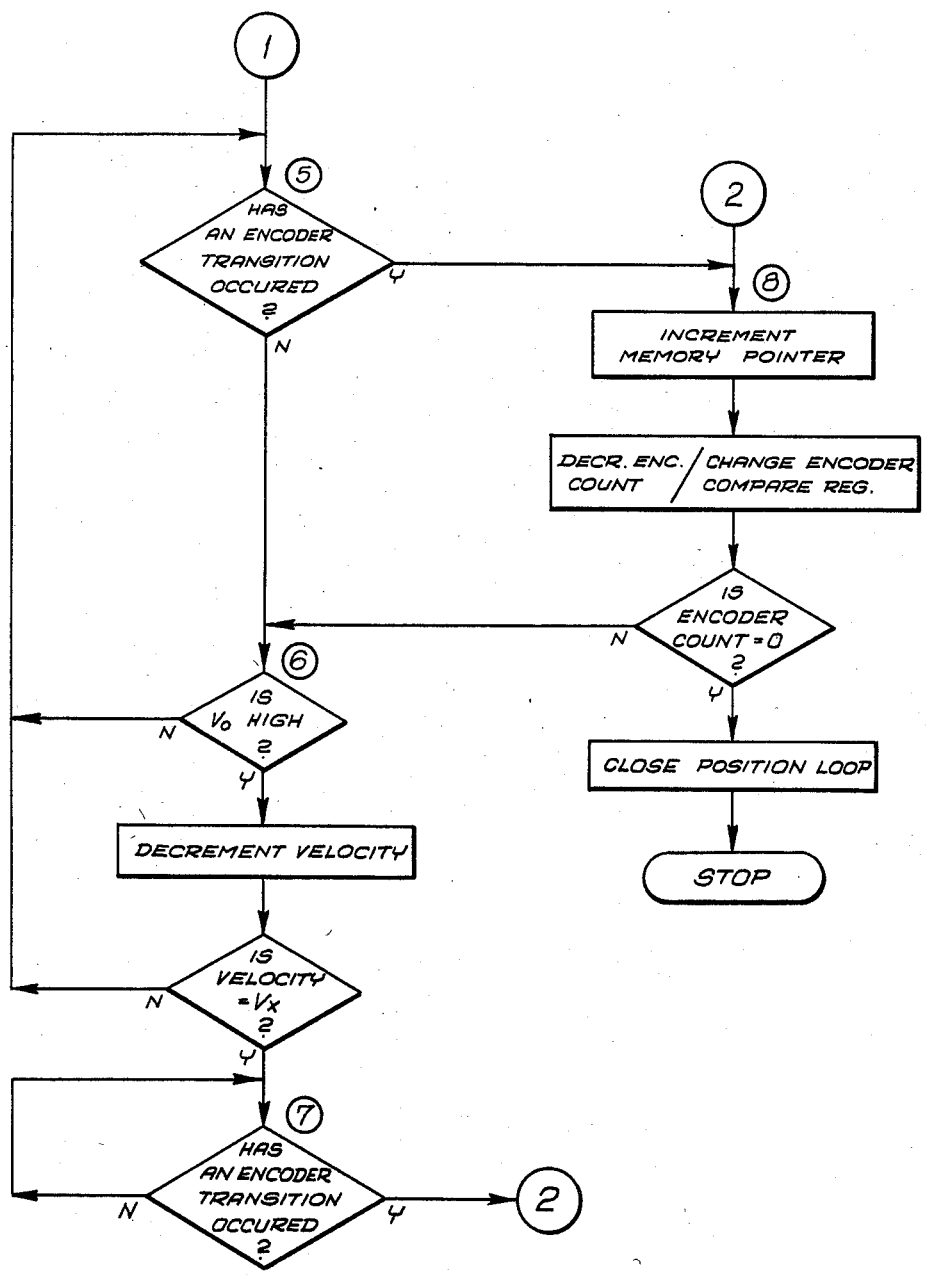

The flow chart for the microprocessor is shown in FIGS. 3–4 and the control program for the microprocessor is shown in Table 1. The control provided by the microprocessor could alternatively be accomplished with TTL circuitry, although such an implementation would be more expensive.

Figure 5:
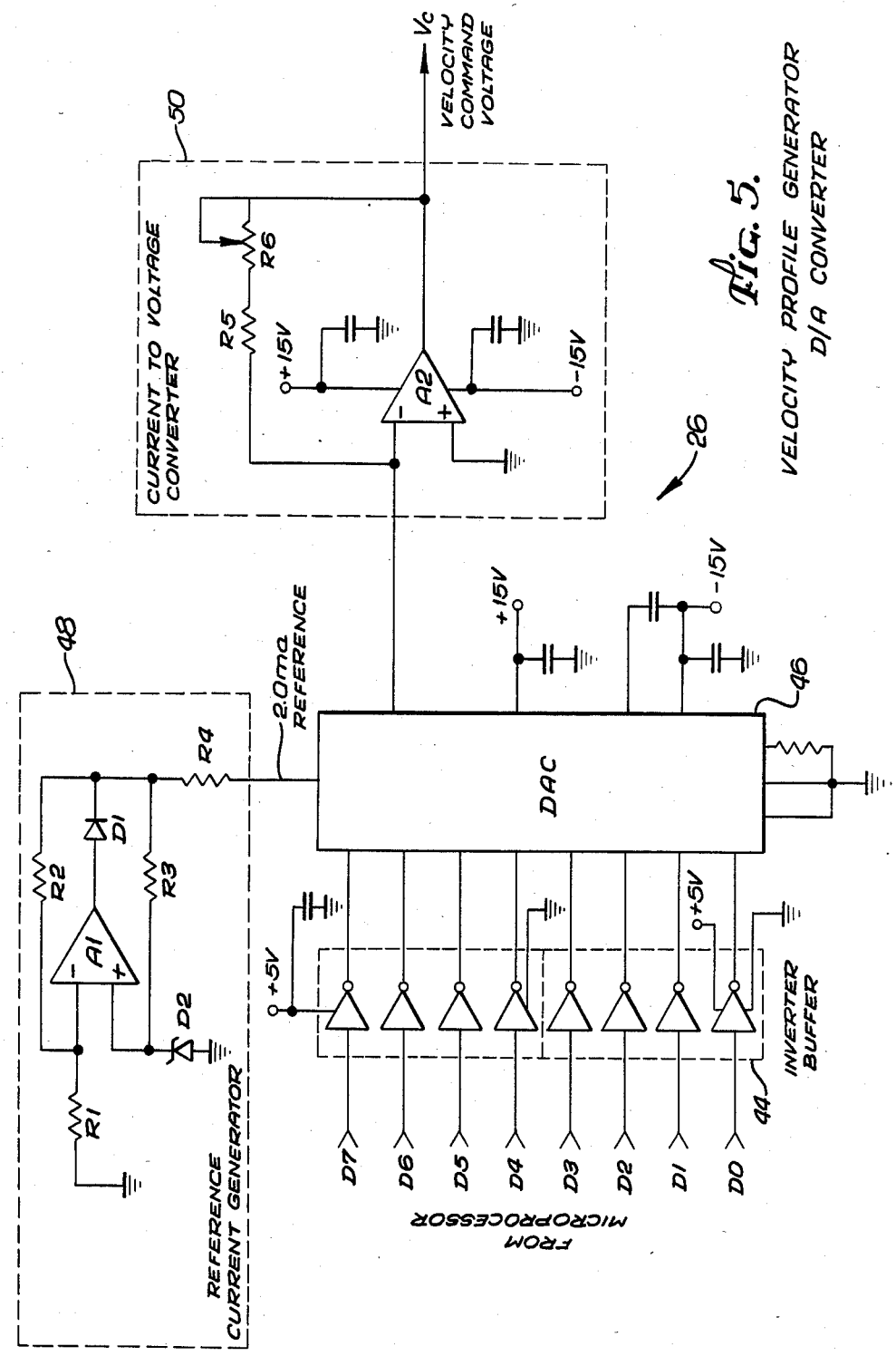
FIG. 5 is a schematic of the digital to analog converter of the velocity profile generator of FIG. 1.

The D to A converter 26 is shown in greater detail in FIG. 5. The converter includes a plurality of inverter buffers 44 which receive inputs from the microprocessor, a digital to analog converter 46, a reference current generator 48 and a current to voltage converter 50. The reference current generator 48 provides a highly accurate 2.0 MA reference for the converter 46, and is comprised of an amplifier A1, resistors R1–R4 and diodes D1 and D2. The converter 50 converts the current output of the digital to analog converter 46 to a voltage output Vc. The converter 50 includes an amplifier A2 and resistors R5 and R6. R6 is a potentiometer which is used to adjust the servo system for proper step response.

Figure 6:
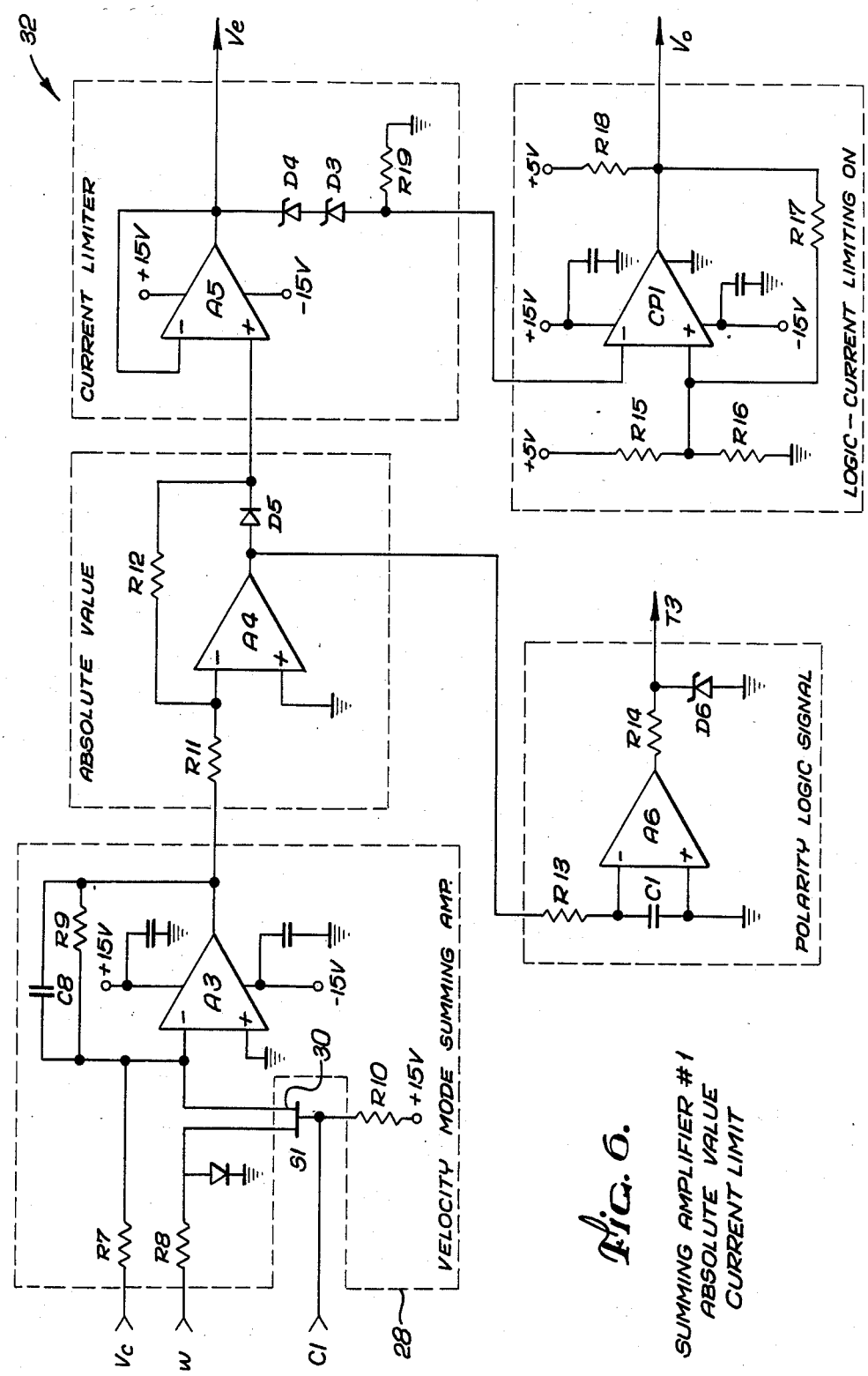
FIG. 6 is a schematic diagram of a summing amplifier and the absolute value and current limit circuitry of FIG. 1.

The circuitry of the summing amplifier 28 and absolute value and current limiter 32 is shown in FIG. 6. Elements C8, R7–R10 and A3 make up the summing amplifier 28. The switch 30 opens and closes the velocity loop. The summing amp circuitry is simply an op amp used in the inverting mode. Resistors R7–R9 are selected to set the proper loop gain. C8 creates an open loop pole at 1200 Hz. The summing amp subtracts the velocity signal from the output Vc of the velocity profile generator and provides a difference signal at its output.

The absolute value circuitry includes an amplifier A4, resistors R11 and R12 and a diode D5. This circuit gives an output equal to the absolute value of the error signal. The magnitude of this signal is limited by a current limiter including amplifier A5, resistor R19 and diodes D3 and D4. Whenever the error exceeds a limit set by D3, D4 and R19, the output of A5 is clamped to a predetermined level. When this occurs, a logic signal Vo is generated by a circuit including comparator CP1 and resistors R15–R18. The current limit is chosen to be at a level just below motor demagnetization. A signal T3 is generated by circuitry including amplifier A6, resistors R13 and R14, capacitor C1 and a diode D6 to indicate the polarity of the error signal.

Figure 7:
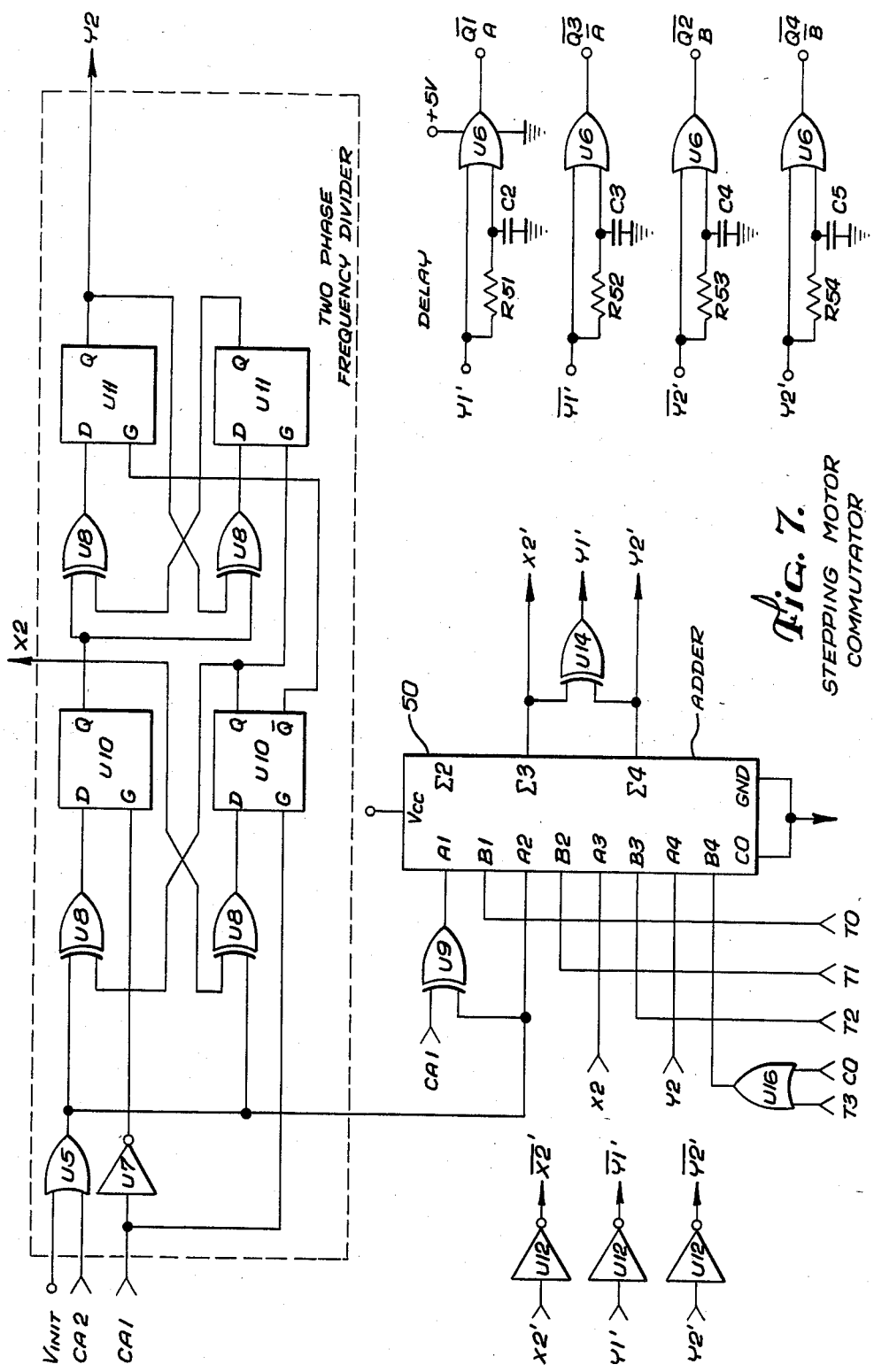
FIG. 7 is a schematic diagram of the commutator circuitry of the control system.

A portion of the commutating and phase advance circuitry 16 and the squaring circuitry 22 is shown in FIGS. 7 and 8. The commutating circuitry provides control signals A, A, and B which select which phases of the motor will be energized. In addition, phase advance is provided to insure maximum accelerating and decelerating torque and to compensate for the time constant of the motor.

The squaring circuitry 22 includes comparators CP2 and CP3 and resistors R45–R50. The outputs CA1 and CA2 of the squaring circuitry are fed to a two phase frequency divider composed of gates U8, gated latches U10 and U11, a gate U5 and an inverter U7. The frequency divider provides outputs X2 and Y2 which are connected as inputs to an adder 50. Signals CA1 and CA2 from the squaring circuitry are also coupled to inputs of the adder, with the signal CA1 being coupled via gate U9 and CA2 coupled via gate U5.

The four inputs A1–A4 to the adder 50 make up a four bit number which represents motor position within one motor phase cycle. The energization of the motor phases is controlled as a function of motor position. The adder provides output signals X2', Y1' (through a gate U14) and Y2'. These signals are inverted by inverters U12. The inverted signals are used along with Y1' to generate the control signals A, A, B and B, which are delivered to the power amplifier 12. Delay circuitry including OR gates U6, resistors R51–R54 and capacitors C2–C5 creates a short delay between the rising edge of one signal and the falling edge of its complement so that the power amplifier output transistors do not cause coincident energization of complementary phases of the motor.

An additional four bit number provided at inputs B1–B4 of the adder 50 is employed to create a phase advance or retard in the motor timing. This phase shift is provided to insure maximum torque during acceleration and deceleration. During acceleration, a positive 90° phase shift is added to provide maximum torque. Maximum deceleration torque is provided by a negative 90° (or positive 270°) phase shift. The direction of the phase shift compensation is controlled by the polarity signal T3 from the absolute value circuit 32, which indicates the direction of error of the velocity signal. The signal T3 is connected to the adder through a gate U16. When T3 goes high, indicating that the velocity is greater than the desired velocity, the input B4 goes high, giving an additional 180° positive phase shift. This provides maximum deceleration torque.

As the velocity of the motor increases, additional phase advance is required to maintain maximum torque due to the motor time constant. The phase advance circuit shown in FIG. 9 generates outputs T0, T1 and T2 to provide this necessary phase advance. Basically, this circuit is a nonlinear analog to digital converter whose output is a function of motor velocity. The outputs of comparators CP4–CP7 are normally low, but go high when the motor velocity signal Vt exceeds the value set by potentiometers R55–R58. A priority encoder U13 outputs one of six three bit words corresponding to an electrical phase shift of the motor timings. When input C1 is high (during the position mode) the outputs are all high, corresponding to a phase of 0°. When C1 is low, the inputs from the comparators are enabled, and the output of the priority encoder will be a number corresponding to a phase shift of between plus 90° and plus 180° in 22.5° increments. Op/amp A14 and resistors R75 and R76 (FIG. 10) invert the velocity signal from the tachometer circuitry 20 for use by the comparators.

Thus, the commutator and phase advance circuitry of FIGS. 7 and 9 controls the connection of the error signals to the proper phases of the motor. The circuitry provides either a positive 90° or negative 90° (positive 270°) phase shift to provide maximum accelerating or decelerating torque. In addition, because of the motor electrical time constant, additional phase advance is added at higher speeds to maintain maximum torque.

The microprocessor 24 monitors the position of the motor by counting transitions at CA2. When the motor has reached a predetermined position, the microprocessor causes the signal CO/C1 to go high, which causes the system to switch to the position mode. In this mode, the switch 30 is opened and the switch 38 is closed. In addition, the signal CO/C1 puts the phase shift at zero.

Figure 11:
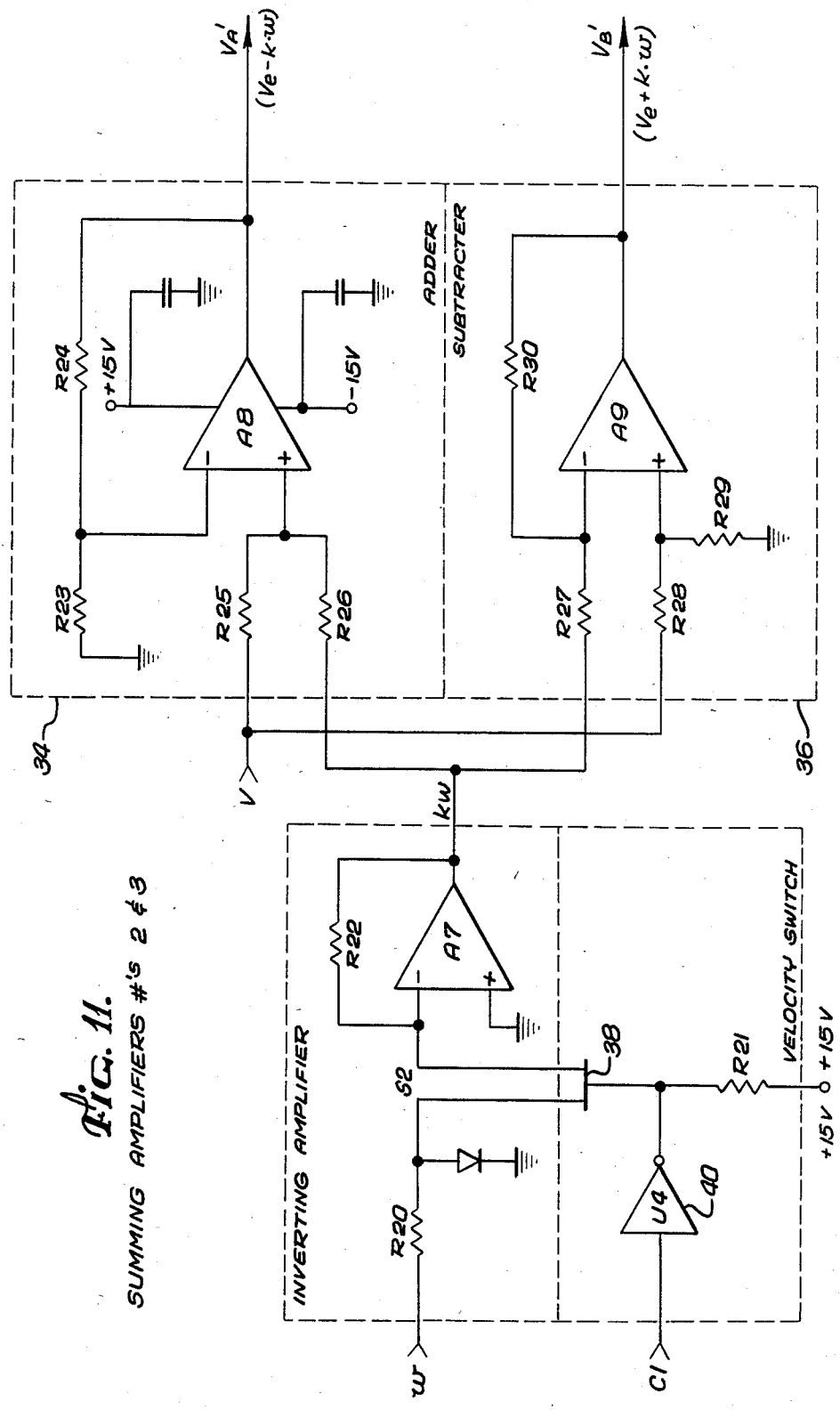
FIG. 11 is a schematic diagram of summing amplifiers used in the position mode to provide damping.

When the system switches to the position mode, the velocity profile generator 25 provides a constant voltage signal for driving the motor in a stepping mode. The velocity signal from the velocity profile generator is passed through the first summing amplifier 28 to the second and third summing amplifiers 34 and 36. The amplifier 34 sums the constant voltage from the velocity profile generator (passed through the circuit 32 as Ve with) the velocity output of the tachometer circuitry 20, and the summing amplifier 36 sums the constant voltage with the inverse of velocity. As shown in FIG. 11, switch 38, inverter 40 and resistor R21 form a switch to close the position velocity loop when in the position mode. An inverting amplifier including op amp A7 and resistors R20 and R22 give the velocity signal the proper polarity and gain for critical damping. The summing amplifier 34 includes an amplifier A8 and resistors R23–R26. The summing amplifier 36 includes an amplifier A9 and resistors R27–R30. The summing amplifiers thus provide signals Va' which equals Ve−K and Vb' which equals Ve +K. These signals are then provided to the damping selector 14.

Figure 12:
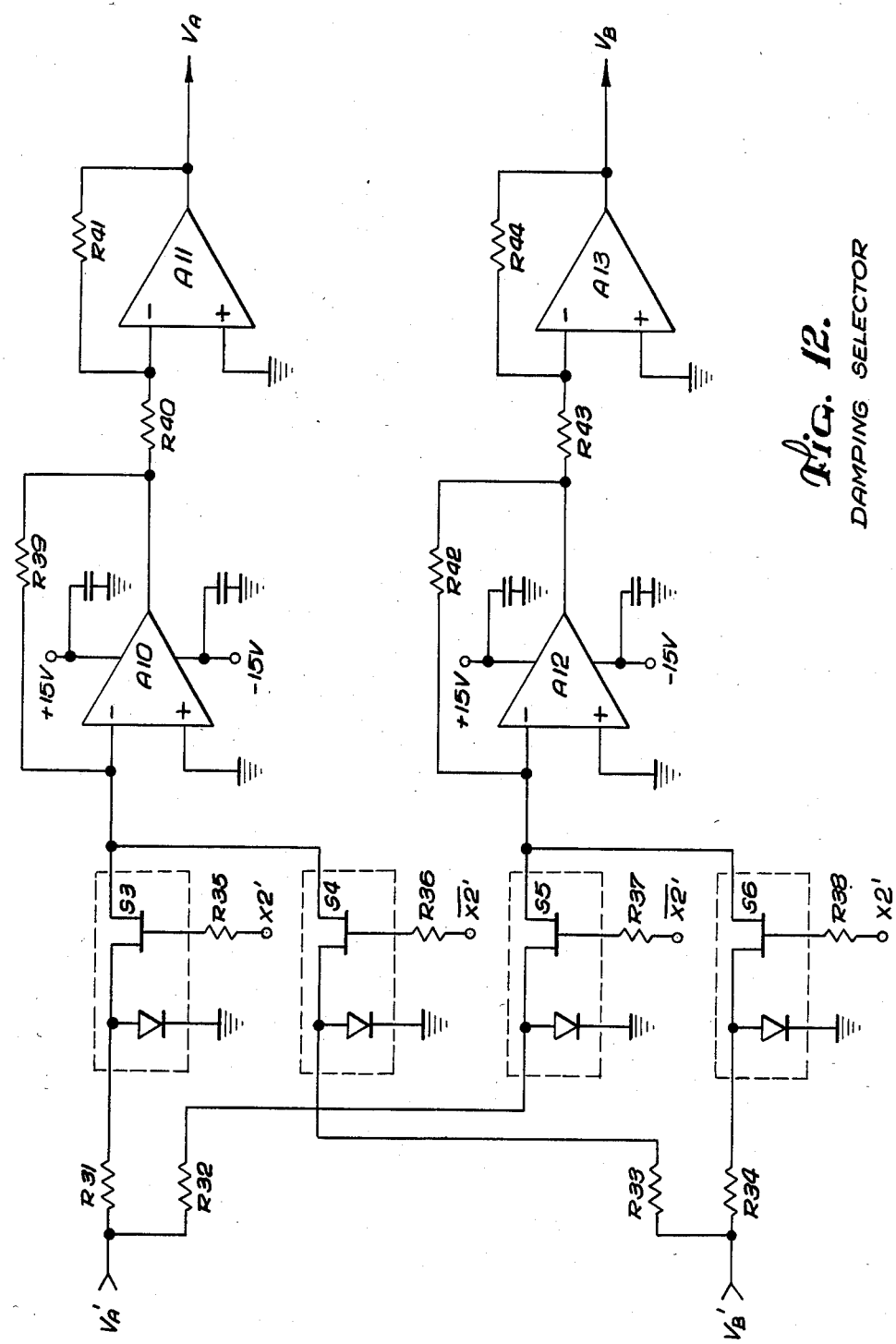
FIG. 12 is a schematic diagram of the damping selector of FIG. 1.
Figure 13:
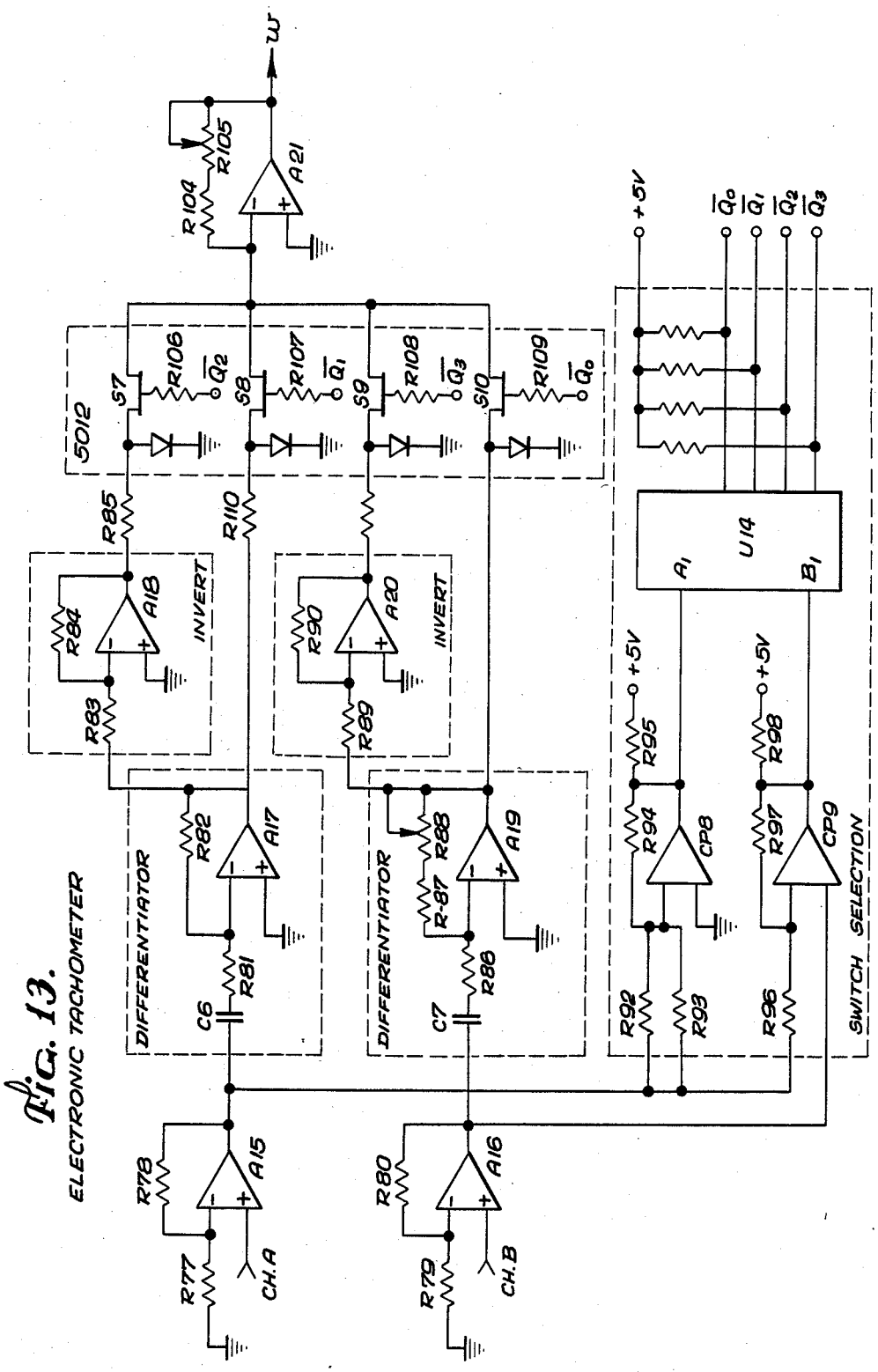
FIG. 13 is a schematic diagram of the tachometer used in the control system.

The damping selector 14 routes the signals from the summing amplifiers 34 and 36 to the proper phases in the power amplifier 12. The damping selector is shown in detail in FIG. 12. The outputs Va' and Vb' are coupled to switches S3–S6 for proper phase pair selection. These switches are controlled by the signals X2' and X2' from the commutator. Switches S3 and S4 and resistors R35 and R36 are used to select either input Va' or Vb' to be sent to the output Va. Switches S5 and S6 and resistors R32 and R34 are used to select either input Vb' or Va' to be sent to the output Vb. Op amps A10, A11 and resistors R31 or R33 form two inverters in series to give no polarity change. Op amps A12, A13 and resistors R32 or R34 and R42–R44 perform a similar function. Resistors R35–R38 eliminate FET switching transients from the output. The outputs Va and Vb are coupled to the power amplifier 12 to drive the motor.

The damping selector thus provides current signals which are a function of velocity. As the motor comes close to the null position (i.e., the desired position) it has a natural tendency to ring. In order to overcome this tendency, a velocity signal is added in one phase, and subtracted in the other to increase and decrease the drive currents as required. That is, as the motor initially approaches the null position with a positive velocity, the null is effectively shifted proportional to velocity in such a manner that the motor velocity decreases smoothly to zero at the null point. The provision of the velocity feedback thus tends to cause the motor to stop at the null position more rapidly than would otherwise be the case.

The tachometer 20 is shown in detail in FIG. 3. This is an electronic tachometer which uses the slope magnitude sampling method to obtain velocity signals. Op amps A15 and A16 along with resistors R77–80 amplify the encoder outputs to the desired level. Op amps A17 and A19 along with resistors R81, R82, R86, R87 and R88 and capacitors C6 and C7 form differentiators whose output amplitude is proportional to the input slope, which is in turn proportional to velocity. A18, A20, R83, R84, R89 and R90 invert the differentiator outputs so there is always either a positive signal at one of the four inputs to the switches S7–S10, or a negative signal at one of the four switch inputs. Comparators CP8 and CP9, encoder U14 and resistors R92–R98 select which switch to turn on at anytime so that the output is a continuous positive or negative signal, depending on the direction of motor rotation. Op amp A21 amplifies the switched signal for the final tachometer output. Potentiometer R105 adjusts the tachometer gain. Potentiometer R88 is used to equalize the two differentiated signals.

In summary, the present invention provides a motor control system employing a stepping motor which is effectively driven as a DC brushless motor during initial acceleration and deceleration and is switched to operate as a stepping motor only during final positioning. When in the velocity mode, closed loop commutation is used to control the switching of the phases so that there is maximum torque utilization. Furthermore, the phase switching is advanced electronically as a function of velocity so that torque is optimized at all motor velocities. A closed loop control system is utilized when in the velocity mode. A microprocessor controls the step motor operation and the closed loop approach enables the motor to step at its full potential while being controlled. Near the end of a step from one line to the next, the system is switched so as to cause the motor to function as a step motor. Velocity dependent damping is added to further improve the positioning of the motor.

Although the invention has been described in terms of specific circuitry, it should be appreciated that many modifications and variations will occur to those skilled in the art. Therefore, the scope of the invention should be determined from the appended claims rather than the foregoing description.

We claim:

1. An incremental motion motor control system, comprising:
   a stepping motor having a plurality of phases and a plurality of discrete null positions;
   position means for determining the angular position of the stepping motor;
   velocity means for determining the angular velocity of the stepping motor;
   commutator means for commutating the phases of the stepping motor as a function of the output of the position means during a velocity mode of operation, wherein the commutator means operates to commutate the phases of the motor to achieve maximum torque, and wherein the commutator includes (a) first phase advance means for modifying the energization of the phases of the stepping motor during the velocity mode so as to provide maximum accelerating and decelerating torque and (b) second phase advance means for further modifying the energization of the motor as a function of the velocity of the motor to thereby obtain maximum torque despite variations in velocity and despite the electrical time constant of the motor; and
   drive means for driving the stepping motor during the velocity mode of operation in accordance with the difference between a desired velocity and the actual velocity of the motor as determined by the velocity means.

2. The control system of claim 1 wherein the velocity means includes tachomater circuitry connected to the output of the position means, wherein the tachometer circuitry processes the position output to obtain a velocity output.

3. The control system of claim 1 wherein the drive means includes:
   velocity profile generator means for receiving the output of the position means and providing a velocity command signal representing the desired velocity of the motor as a function of motor position; and
   error means for providing an error signal representing the difference between the velocity command signal and velocity feedback signal, wherein the error signal is used to drive the motor.

4. The control system of claim 3 wherein the error means includes limiting circuitry for limiting the magnitude of the error signal to a value just below that which causes motor demagnitization to occur.

5. The control system of claim 1 wherein the drive means drives the stepping motor during a position mode of operation to position and hold the motor at a desired null position as determined by the commutator means, wherein the drive means includes means for providing first and second drive signals for the motor, and wherein the control system further includes damping means for adding a velocity proportional signal to the first drive signal and subtracting a velocity proportional signal from the second drive signal, and wherein said modified drive signals are used to drive the motor during the position mode of operation.

6. An incremental motion motor control system, comprising:
   a stepping motor having a plurality of phases and a plurality of discrete null positions;
   drive means for providing first and second drive signals to different phases of the motor thereby to drive the motor;
   feedback means for determining the angular velocity and position of the motor;
   velocity mode control means for effectively driving the stepping motor as a brushless DC motor during a velocity mode to a predetermined angular position of the motor as determined by the feedback means, including;
   (a) velocity profile generator means coupled to the feedback means, for generating a reference signal representative of the desired velocity of the motor as a function of motor position;
   (b) commutator means for commutating the phases of the motor as a function of the angular position of the motor as determined by the feedback means, and around the peak of the torque curves of the motor;
   (c) phase advance means for modifying the commutating of the phases of the motor as a function of the angular velocity of the motor as determined by the feedback means, to compensate for the electrical time constant of the motor; and
   (d) first generating means for generating the first and second drive signals during the velocity mode in accordance with the difference between the desired velocity signal and the angular velocity of the motor as determined by the feedback means;
   position mode control means for subsequently controlling the commutation of the motor and driving the motor to move it to one of said null positions and maintain the motor at said null position during a position mode, including second generating means for genetating the first drive signal during the position mode in accordance with the sum of a fixed drive signal and a signal proportional to the angular velocity of the motor as determined by the feedback means, and for generating the second drive signal during the position mode in accordance with the difference between said fixed drive signal and said velocity proportional signal; and
   switching means for selectively coupling the velocity mode control means and position mode control means to control the motor, wherein the switching means is switched when the motor reaches a predetermined angular position as determined by the feedback means.

7. An incremental motion motor control system, comprising:
   a stepping motor having a plurality of phases and a plurality of discrete null positions;
   feedback for determining the angular velocity and position of the motor;
   velocity mode control means for:
   (a) commutating the motor as a function of its determined angular position; and
   (b) driving the motor in accordance with the difference between a desired velocity and the determined velocity, thereby effectively operating the stepping motor as a brushless DC motor; and
   position mode control means for subsequently controlling the commutation of the motor and driving the motor to move it to one of said null positions and maintain the motor at said null position, and for damping movement of the motor as it nears the target position by providing a force proportional to the velocity of the motor.

8. The system of claim 7 including switching means for selectively coupling the velocity mode control means and position mode control means to control the motor, wherein the switching means is switched when the motor reaches a predetermined position as determined by the feedback means.

9. The system of claim 8 wherein the velocity mode control means comprises:
   velocity profile generator means, coupled to the feedback means, for generating a reference signal representative of the desired velocity of the motor as a function of motor position; and
   first error means for generating an error signal representing the difference between the reference signal and velocity signal, wherein the motor is driven as a function of the error signal.

10. The system of claim 9 wherein the first error means includes means for limiting the value of the error signal to a predetermined maximum level.

11. The system of claim 9, wherein the velocity profile generator means includes:
   a microprocessor and memory for generating a digital signal representing the desired velocity of the motor; and
   a digital-to-analog converter connected to receive the digital signal and generate the reference signal in response thereto.

12. The system of claim 8 including commutator means for commutating the different phases of the stepping motor wherein the commutator means includes first phase advance means for altering the timing of the energization of the motor phases to increase the accelerating and decelerating torque of the motor.

13. The system of claim 12 including second phase advance means for altering the timing of the energization of the motor phases as a function of motor velocity to thereby obtain maximum torque despite variations in velocity and despite the electrical time constant of the motor.

14. The system of claim 13 wherein the second phase advance means includes an analog-to-digital converter which receives an analog input signal representing motor velocity and generates a digital output representing a desired amount of alteration of energization of the motor phases.

* * * * *